US008692979B2

(12) United States Patent
Moench et al.

(10) Patent No.: US 8,692,979 B2
(45) Date of Patent: Apr. 8, 2014

(54) LASER SENSOR SYSTEM BASED ON SELF-MIXING INTERFERENCE

(75) Inventors: Holger Moench, Vaals (NL); Mark Carpaij, Aachen (DE); Alexander Marc Van Der Lee, Venlo (NL); Stefan Schwan, Herzogenrath (DE); Meng Han, Aachen (DE); Marcel Franz Christian Schemmann, Maria Hoop (NL)

(73) Assignee: Koninklijke Philips N.V., Eindhoven (NL)

( * ) Notice: Subject to any disclaimer, the term of this patent is extended or adjusted under 35 U.S.C. 154(b) by 432 days.

(21) Appl. No.: 12/812,046

(22) PCT Filed: Jan. 12, 2009

(86) PCT No.: PCT/IB2009/050109
§ 371 (c)(1),
(2), (4) Date: Sep. 29, 2010

(87) PCT Pub. No.: WO2009/090593
PCT Pub. Date: Jul. 23, 2009

(65) Prior Publication Data
US 2011/0007299 A1 Jan. 13, 2011

(30) Foreign Application Priority Data
Jan. 16, 2008 (EP) .................................... 08100525

(51) Int. Cl.
*G01C 3/00* (2006.01)
*G01P 3/36* (2006.01)

(52) U.S. Cl.
USPC ................................ 356/3; 356/27

(58) Field of Classification Search
USPC .................................................. 356/27–28.5
See application file for complete search history.

(56) References Cited

U.S. PATENT DOCUMENTS

| 4,167,329 A | 9/1979 | Jelalian et al. |
| 4,652,122 A | 3/1987 | Zincone et al. |

(Continued)

FOREIGN PATENT DOCUMENTS

| WO | 0237410 A1 | 5/2002 |
| WO | 03038446 A1 | 5/2003 |

(Continued)

OTHER PUBLICATIONS

Raoul et al: "A Double-Laser Diode Onboard Sensor for Velocity Measurements"; IEEE Transactions on Instrumentation and Measurement, vol. 53, No. 1, Feb. 2004, pp. 95-101.

(Continued)

*Primary Examiner* — Tara S Pajoohi Gomez

(57) ABSTRACT

A sensor module (1) for measuring the distance to a target and/or the velocity of the target (50), the sensor module (1) comprising at least one laser source (100), at least one detector (200) being adapted to detect modulated laser light and at least one control element the control element (400) being adapted to vary the focus point of the laser light and/or the intensity of the laser light and/or the direction of the laser light. The control of the laser light emitted by the laser source (100) either by active optical devices as variable focus lenses or controllable attenuators or passive optical elements in combination with arrays of laser sources (100) and detectors (200) enable flexible and robust sensor modules.

11 Claims, 5 Drawing Sheets

(56) References Cited

U.S. PATENT DOCUMENTS

| | | |
|---|---|---|
| 4,733,609 A | 3/1988 | Goodwin et al. |
| 5,594,543 A | 1/1997 | deGroot et al. |
| 5,838,439 A | 11/1998 | Zang et al. |
| 6,233,045 B1 | 5/2001 | Suni et al. |
| 6,707,027 B2 | 3/2004 | Liess et al. |
| 7,129,508 B2 | 10/2006 | Chen |
| 2003/0122054 A1 | 7/2003 | Wilson et al. |
| 2007/0026180 A1 | 2/2007 | Lavature |
| 2007/0058157 A1 | 3/2007 | Deines |
| 2007/0206180 A1* | 9/2007 | Liess ................ 356/28 |
| 2008/0007713 A1 | 1/2008 | Zijp |

FOREIGN PATENT DOCUMENTS

| | | |
|---|---|---|
| WO | 2006042072 A2 | 4/2006 |
| WO | 2007026293 A2 | 3/2007 |
| WO | 2007072446 A2 | 6/2007 |

OTHER PUBLICATIONS

Vogel et al: "A Low-Cost Medium-Resolution Rangefinder Based on the Self-Mixing Effect in a VCSEL"; IEEE Transactions on Instrumentation and Measurement, vol. 54, No. 1, Feb. 2005, pp. 428-431.

Shinohara et al: "Compact and High-Precision Range Finder With Wide Dynamic Range and Its Application"; IEEE Transactions on Instrumentation and Measurement, vol. 41, No. 1, Feb. 1992, pp. 40-44.

* cited by examiner

LASER SENSOR SYSTEM BASED ON SELF-MIXING INTERFERENCE

FIELD OF THE INVENTION

The current invention is related to a system and a method for measuring the distance to a target and/or the velocity of the target. The invention is further related to the use of such a system.

BACKGROUND OF THE INVENTION

In US 2007/0058157 A1 a system for measuring velocity of a target is disclosed. The system includes a laser device, a detector and a signal processor. The laser device produces a frequency-modulated laser beam, wherein the frequency-modulated beam is split into at least two laser beams, wherein a reflected beam comprising one split beam is directed to the target and reflected from the target. The detector detects a combination of the reflected beam and a reference beam comprising another split beam, wherein the reflected beam and the reference beam have unequal delays. The signal processor obtains velocity information from the combined beam by use of Doppler-shifted harmonics of the modulation frequency. Dynamic range and flexibility of the disclosed sensor module is an issue.

SUMMARY OF THE INVENTION

It is an object of the current invention to provide an improved sensor module for measuring the velocity of a target and/or the distance of the target.

The object is achieved by means of a sensor module for measuring a distance to a target and/or a velocity of the target, the sensor module comprising at least one laser source for emitting laser light, at least one detector being adapted to detect modulated laser light and at least one control element, the control element being adapted to vary a focus point of the laser light and/or intensity of the laser light and/or direction of the laser light.

The detector may be for example a classical interferometer with a beam splitter, mirrors and a photodiode well known by those experienced in the art. The modulation of the laser light may be caused by a Doppler shift of reflected laser light due to the movement of the target interfering with the laser light emitted by the laser source. The photodiode may convert the optical signal of the modulated laser light to an electrical signal, the electrical signal may be analyzed by means of the detector or the control element and depending on the result the laser light emitted by the laser source for example a laser diode may be varied by means of the control element. The laser source may for example be slanted in a controlled way with respect to a reference axis and the slanting angle is monitored. Slanting of the laser source may cause a variation of the velocity component of the target being parallel to the laser light. The combination of the known slanting angle with respect to the reference axis and the velocity component parallel to the laser light may enable the determination of the velocity component of the target parallel to the reference axis. Due to the fact that the frequency of the Doppler shift and the resulting frequency modulation of the laser light that may be detected by the photodiode is proportional to the velocity component of the target being parallel to the beam of the laser light emitted by the laser source, controlled slanting of the laser source may enable to increase the range of velocities that may be detected by the sensor module. Depending on the slanting angle the same modulation frequency of the laser light may represent different velocities of the target parallel to the reference axis. It may be advantageous to combine the laser source with a lens in order to focus the emitted laser light on the target. The sensor module may comprise a driver circuitry or driver circuitries for the laser source, the detector and/or the control element. Further one or more power supplies as for example a battery may be added to the sensor module.

The variation of the intensity of the laser light is meant as variation between intensities different from zero intensity excluding pulsed driving of the laser source. Further the variation may be continuous or discontinuous.

As an alternative to the classical interferometer approach the detector may detect a modulation of resonating laser light in the laser source. The modulation of the laser light in the laser source may be induced by laser light reflected by the target reentering the laser source. The effect is known as Self-Mixing-Interference (SMI) by those skilled in the art. Depending on the electrical driving scheme of the laser source either the distance and/or the velocity of the target can be detected. The detector may be a photo-diode and the laser source may be a laserdiode as for example a side emitting laser-diode a Vertical Cavity Surface Emitting Laser (VCSEL) or Vertical Extended Cavity Surface Emitting Laser (VECSEL). Especially VCSEL or VECSEL allow integrating the photodiode and the laser-diode in one device by means of semiconductor processing. Details about detection of velocities by means of self-mixing interference can for example be found in WO 02/37410 A1 FIG. 2 to FIG. 7 and the related description.

In another embodiment according to the current invention the control element comprises an optical element and the optical element is placed between the target and the laser source. The intensity of the laser light may for example be varied by means of a variable optical attenuator between the laser source and the target, which may improve signal to noises ratio of the detected modulation of the laser light by preventing non-linearities caused by high intensities of the laser light reflected by the target. Alternatively or in addition the focus point of the laser light may be varied by means of a variable focus lens, which may increase the detection range of the sensor module in comparison to sensor modules with a lens with a fixed focus. Further the laser light may be slanted with respect to a reference axis by means of a moveable mirror between the laser source and the target, which may increase the range of velocities those may be detected as discussed above in connection with the slanting of the laser source itself.

In a further embodiment according to the current invention the sensor module comprises at least two laser sources and at least two detectors and the laser sources are adapted to emit laser light in essentially the same direction. The adaption of the laser sources to emit laser light in essentially the same direction means that the laser sources are aligned in parallel in order to emit laser light in the same direction. After the emission the laser light emitted by the different laser sources may be manipulated e.g. by means of the control element causing a deviation from the direction of emission of the laser light, whereby the deviation from the direction of emission of the laser light may be different for different laser sources. Each laser source may have a dedicated detector only detecting the modulation of the laser light emitted by the belonging laser source. The laser sources and the detectors may for example be integrated SMI sensors manufactured by semiconductor processing. The laser light of at least two different laser sources may be varied differently by means of the control element with respect to the focus point of the laser light and/or the intensity of the laser light and/or the direction of the laser light. The latter may be done for example by means of variable optical attenuators, variable focus lenses or moveable mirrors provided for at least two or all laser sources integrated in the sensor module. Alternatively a passive optical element may be used in order to vary or manipulate the laser light emitted by the laser sources differently. This may for example be done by means of a curved mirror reflecting laser light emitted by one laser source depending on the point on the mirror where the emitted laser light hits the mirror. Using an array of laser sources and detectors may enable a variation of the slanting angle with respect to a reference axis without moving parts. Further lenses with different focal length may be used in order to vary the focus points of laser sources in an array of laser sources. Alternatively or in combination with lenses and/or mirrors the passive optical element may be an optical attenuator. Using for example a first optical attenuator with a first optical attenuation in combination with a first laser source and a first detector and a second optical attenuator with a second optical attenuation different from the first optical attenuation in combination with a second laser source and a second detector may simplify the sensor module. The different laser sources may be driven in parallel or the laser sources may be driven sequentially by using an appropriate electrical driving circuit. Driving the different laser sources sequentially (one after the other) may reduce the complexity of the electronic circuitry. Using passive optical elements in combination with an array of laser sources and detectors (three, four, five or more laser sources and detectors) may enable a flexible, cost effective and reliable sensor module.

In another embodiment according to the current invention the range of detection of a first detector overlaps with the range of detection of at least one second detector. The range of detection may be the range of distances to the target or velocities of the target that can be detected by one defined detector (in combination with the belonging laser source and optical element respectively belonging part of an optical element). That means the first detector may be able to detect velocities between 1 m/s and 10 m/s and the second detector may be able to detect velocities between 3 m/s and 30 m/s. The overlapping range of detection between 3 m/s and 10 m/s may be used to verify the first measurement signal resulting from the detection of modulated laser light detected by the first detector by comparing the first measurement signal with the second measurement signal resulting from the detection of modulated laser light detected by the second detector by means of an analyzer. A velocity measurement of for example 7.6 m/s detected by means of the first detector may be compared with and verified by the velocity measurement of the second detector. Having an array of detectors and belonging laser sources more than one detector may be used to verify the measurement result of one defined detector.

In a further embodiment of the current invention the sensor module further comprises a computing unit and an interface, the computing unit (for example a processor, an ASIC or the like) being arranged to compute distance and/or velocity data of the target based on measurement signals resulting from the detection of modulated laser light detected by at least one detector and the interface being arranged to communicate the distance and/or velocity data of the target for further processing. Further processing comprises displaying the distance and/or velocity data on a display or transmit the distance and/or velocity data to other system(s).

A system comprising a sensor module according to the current invention may be used in automotive applications as driver information systems and brake assistant systems. Further it may be used in one application selected from the group:
  automotive driver information;
  measuring velocity of parts of production equipment;
  measuring velocity of goods in production;
  railway applications
  airplane applications and
  security applications.

It is further an object of the current invention to provide an improved method for measuring the velocity of a target and/or the distance of the target.

The object is achieved by means of a method for measuring a distance to a target and/or a velocity of the target comprising the steps of:
  emitting laser light by means of at least one laser source;
  varying a focus point of the laser light and/or intensity of the laser light and/or direction of the laser light by means of at least one control element
and
  detecting modulated laser light by means of at least one detector.

Using two, three, four or even an array of laser sources in combination with one dedicated detector for each laser source and passive optical elements acting as control elements may result in a highly reliable method for measuring the velocity of a target and/or the distance of the target Additional features will be described below which can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

The present invention will be explained in greater detail with reference to the figures, in which the same reference signs indicate similar parts, and in which.

DETAILED DESCRIPTION OF EMBODIMENTS

Figure 1:
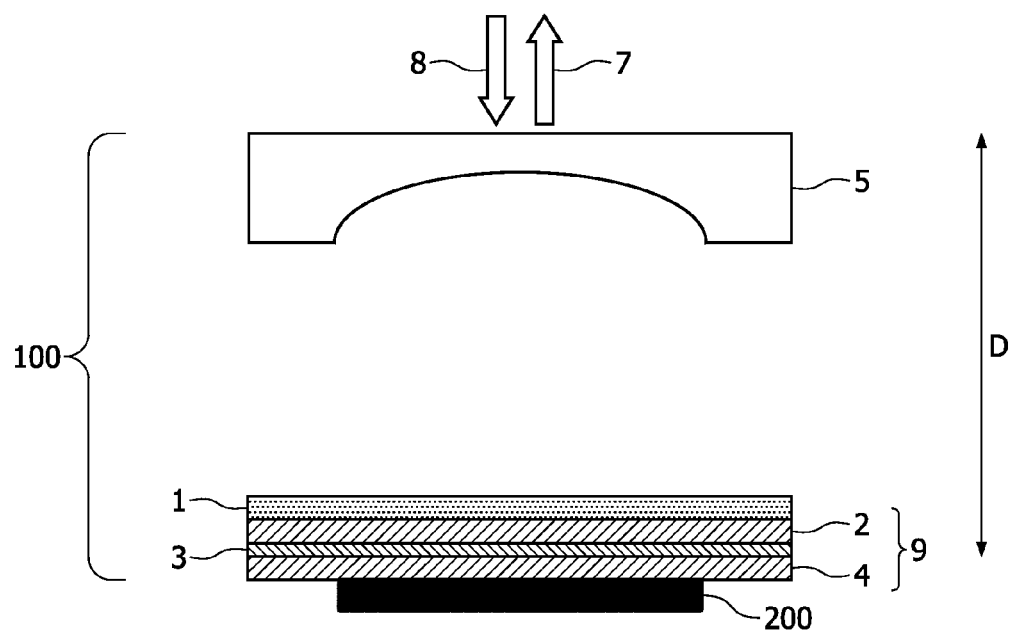
FIG. 1 shows a schematic view of VECSEL comprising a VCSEL and an integrated photo diode.

FIG. 1 shows a VECSEL that may be used as a laser source 100 together with an integrated photo diode that may be used as detector 200 in a sensor module according to the current invention. The VECSEL comprises a VCSEL layer structure 9 and is formed by an electrically pumped gain medium 3 (InGaAs quantum wells embedded in GaAs) embedded between two Distributed Bragg Reflectors (DBR) 2, 4, which form an inner cavity of the laser. The lower DBR 4 is highly reflective (reflectivity preferably >99.5%) for the lasing wavelength, while the upper DBR 2 has a smaller reflectivity in order to allow feedback from the external cavity. One of the DBRs is p-doped and the other n-doped so as to allow efficient current feeding into the gain region. In this example, the lower DBR 4 with the higher reflectivity is p-doped and the upper DBR 2 is n-doped. Principally, however, doping in the reversed order is also possible. The operating current for current injection into the gain medium 3 is provided by an appropriate power source (not shown) being connected to a control unit (not shown) for timely modulating the injection current. A frequency shift of the emitted laser radiation 7 for obtaining the desired distance or velocity information is achieved with this current modulation. A suitable current shape is fed into the gain region via the n and p-DBR electric contacts (not shown in the Figure). The photodiode being attached to the rear side of the lower DBR 4 measures the small amount of radiation leaking from the highly reflective p-DBR mirror 4 and thus monitors the influence of the back-scattered light 8 from the target (not shown in the Figures) on the laser, from which information on the distance or velocity of the target object can be extracted. The VCSEL layer structure 9 is grown on an appropriate optically transparent substrate 1. Such a layer structure on this substrate can be produced in a low-cost production process for VCSEL chips. The photodiode is therefore attached to the rear side of such a chip. The external cavity is formed by a laser mirror 5 placed and adjusted above the upper DBR 2 at a suitable distance. A narrow-band Volume Bragg Grating (VBG) having appropriate small bandwidth IR reflection properties can form this laser mirror 5 or for example a metal or dielectric coated mirror. The gain medium is electrically pumped at a level which does not allow the inner laser cavity system to exceed the laser threshold, but requires feedback of the external cavity, i.e. the external mirror 5, to achieve lasing. In this way, the properties of the emitted laser radiation 7 are determined by the external laser cavity rather than by the short inner cavity on the VCSEL chip. Consequently, also the divergence angle of the emitted laser radiation 7 is decreased and the mode quality is enhanced as compared with a pure VCSEL-based sensor. The laser can thus be better focused on a target object, and the feedback 8 (back-scattered radiation from the target object) into the laser cavity, which is required for the sensing application, is improved. Nevertheless also a simple VCSEL without a mirror 5 and both the lower DBR 4 and the upper DBR 2 being highly reflective (reflectivity preferably >99.5%) for the lasing wavelength can be used as laser source in a sensor module according to the current invention.

Figure 2:
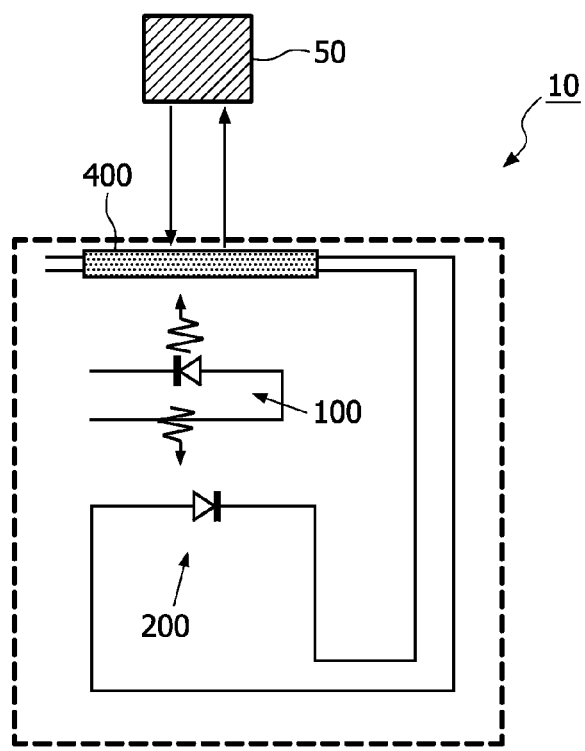
FIG. 2 shows a schematic view of a first embodiment according to the current invention with an autofocus lens used as control element.

FIG. 2 shows a schematic view of a first embodiment of a sensor module 10 according to the current invention. A laser source 100 in this case a VCSEL is connected to a driving circuit (not shown) and a power source (not shown). The laser light emitted by the VCSEL passes a control element 400 comprising a lens with variable focus and control circuitry both being also connected to the power source (not shown). After passing the lens with variable focus the laser light hits the target 50 and a part of the laser light is reflected by the target 50, passes the autofocus lens again and reenters the laser cavity of the VCSEL causing a modulation of the laser light in the laser cavity. The modulation of the laser light in the laser cavity is detected by a detector 200 being a photodiode attached to the VCSEL as discussed above. The electrical signal being generated by means of the photodiode due to the modulation of the laser light in the laser cavity comprises the information to determine e.g. the velocity of the target 50. The information may be processed by a computer and displayed to a user by means of a display. Further the information is used in this embodiment to give a feedback to the lens with variable focus via the control circuitry. Depending on the electrical signal provided by the photodiode the focal length of the lens with variable focus may be changed in order to improve the quality of the electrical signal, enhancing the detection range of the sensor module. Alternatively, the lens with variable focus may be an autofocus lens being independent from the electrical signal provided by the photodiode.

Figure 3:
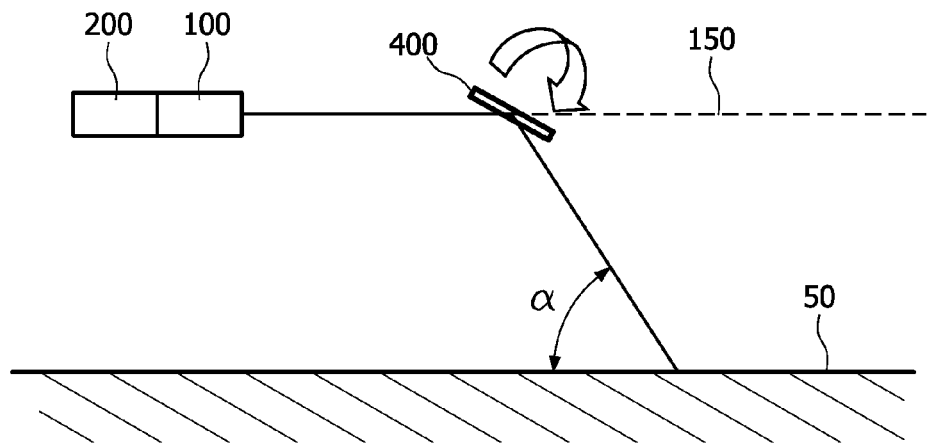
FIG. 3 shows a schematic view of a second embodiment according to the current invention with a moveable mirror used as control element.

A schematic view of a second embodiment of a sensor module according to the current invention is depicted in FIG. 3. The laser source 100 being attached to a detector 200 emits laser light that may be focused by means of a lens (not shown). The laser light emitted by the laser source 100 hits the control element 400, whereby the control element 400 comprises a controllable mirror, control circuitry (not shown) and a motor (not shown) to slant the mirror as indicated by the arrow in FIG. 3 with respect to the reference axis 150 defined by the laser light emitted by the laser source 100 before hitting the controllable mirror. Depending on the slanting angle of the controllable mirror with respect to the reference axis 150 the angle of incident a between the laser light deflected by the controllable mirror and the surface of the target 50 changes. The deflected laser light is at least partly reflected by means of the target 50, again deflected by the controllable mirror and reenters the laser cavity of the laser source 100 causing a modulation of the laser light in the laser cavity being detected by the detector 200. The sensor module may be integrated in a vehicle driving with a velocity $V_0$ on a street (the target 50). Depending on the angle of incident $\alpha$ the velocity component parallel to laser light deflected by the controllable mirror changes with $V_\alpha = V_0 * \cos(\alpha)$. The angle of incidence $\alpha$ may be chosen in a way that the modulation frequency of the modulated laser light in the laser cavity fits best to a computing unit (not shown) being connected to the detector 200 and evaluating the electronic signal provided by the detector 200. As a consequence the computing unit may be rather simple since the bandwidth of the modulation frequencies of the laser light in the laser cavity can be limited by choosing the angle of incidence $\alpha$ by means of the controllable mirror according to the velocity of the vehicle. Feedback loops between the controllable mirror and the computing unit may be used to further optimize the quality of the measurement results measured by the sensor module. Alternatively the controllable mirror may be electronically coupled with a conventional system for measuring the speed of the vehicle.

Figure 4:
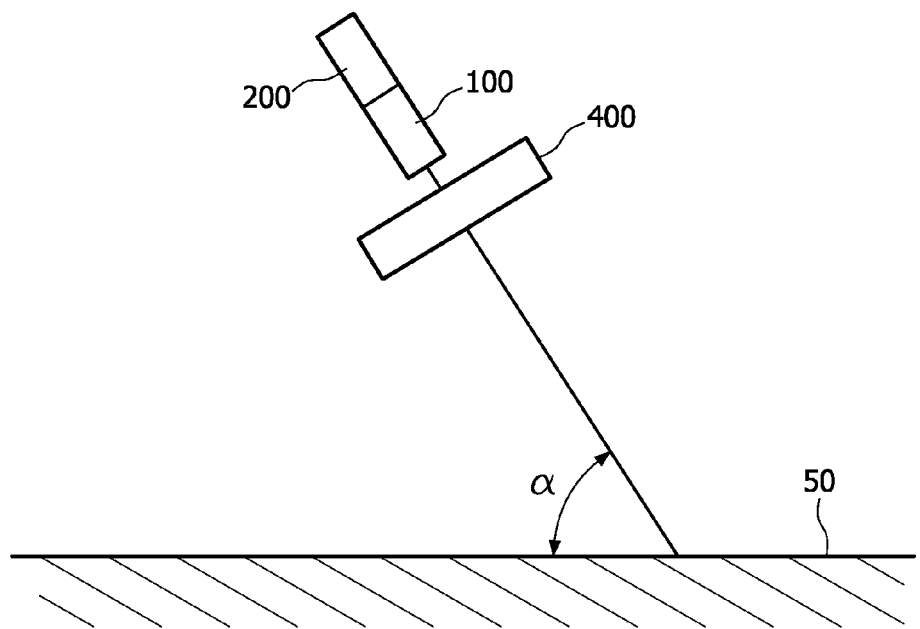
FIG. 4 shows a schematic view of a third embodiment according to the current invention with an adaptable attenuator used as control element.

In FIG. 4 a schematic view of a third embodiment of a sensor module according to the current invention is shown. The laser source 100 being attached to a detector 200 emits laser light that may be focused by means of a lens (not shown). The laser light emitted by the laser source 100 hits the control element 400, whereby the control element 400 comprises a controllable optical attenuator and control circuitry (not shown). The laser light is at least partly reflected by means of a target 50, passes again the controllable optical attenuator and reenters the laser cavity of the laser source 100 causing a modulation of the laser light in the laser cavity being detected by the detector 200. A computing unit (not shown) may be connected to the detector 200 evaluating the electronic signal provided by the detector 200. The controllable optical attenuator may be used to optimize the signal to noise ratio of the sensor module by controlling the amount of laser light reentering the laser cavity. The control signal for controlling may be provided by means of a separate photodiode or by means of a feedback signal provided by the computing unit.

Figure 5:
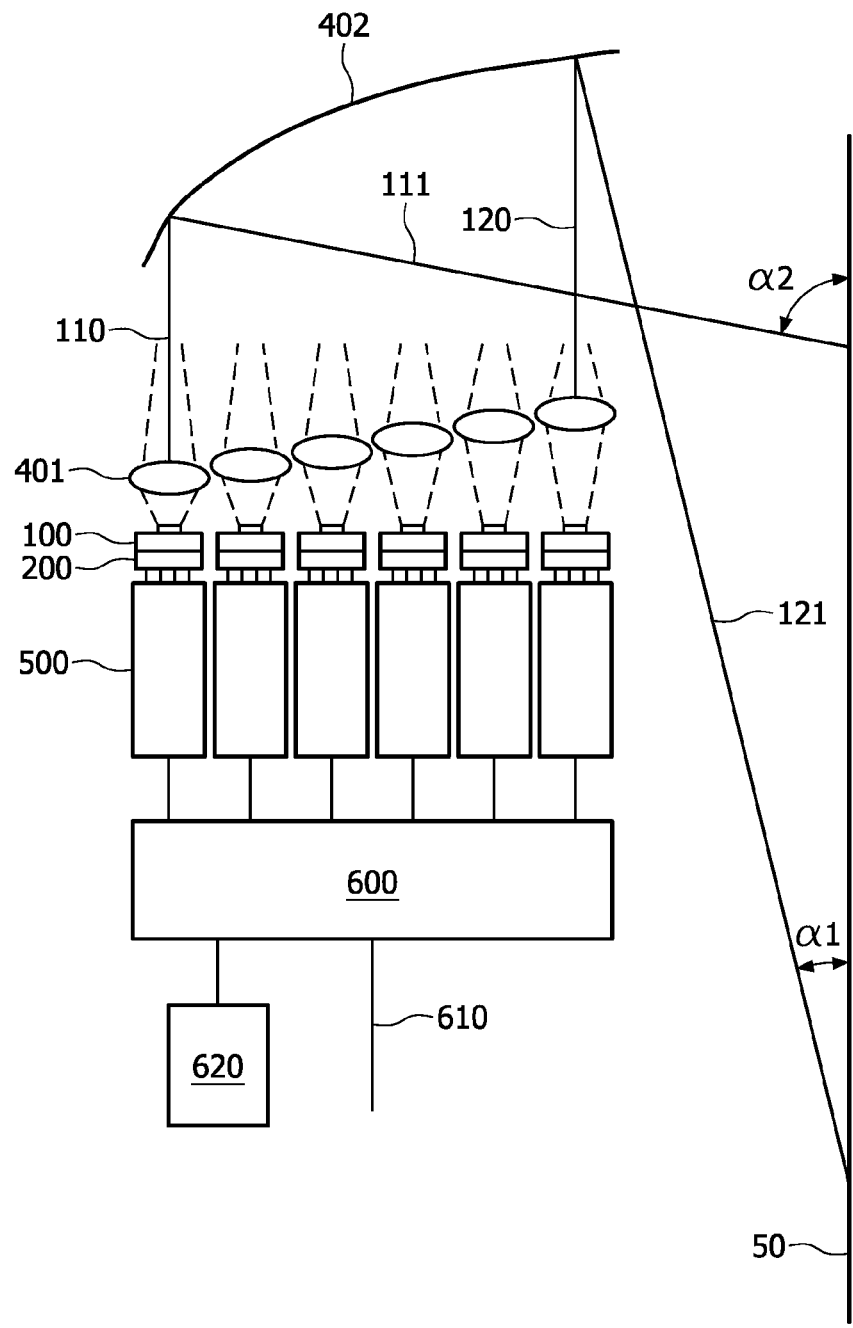
FIG. 5 shows a schematic view of a fourth embodiment according to the current invention with an array of laser sources.

FIG. 5 shows a schematic view of a fourth embodiment of a sensor module according to the current invention. In this embodiment an array of laser sources 100 (VCSELs) are combined. The control element 400 comprises passive optical elements as micro-lenses 401 and a curved mirror 402. The laser light emitted by the laser sources 100 are collimated by the micro-lenses 401 and further focused by the mirror 402 into different directions with respect to the target 50, i.e. the road. The curvature of the curved mirror 402 is chosen in a way to cover the interesting range of angles. The focal length and/or position of the individual micro-lenses 401 is chosen in a way to have similar focusing conditions for the different angles, i.e. the flat ray 121 hitting the road at an angle of incidence $\alpha_1$ has a longer way to reach the road than the steep ray 111 hitting the road at an angle of incidence $\alpha_2 (\alpha_2 > \alpha_1)$. The different position of the micro-lenses 401 yields a different distance to the foci. A different focal length of the individual micro-lens 401 would also do. The target 50 scatters back an amount of light, which is focused by means of the curved mirror 402 and the micro-lenses 401 into the laser cavity of the laser sources 100. The amount of feedback determines the laser power, which is monitored on the backside of the VCSEL with a detector 200, which are photodiodes being integrated with the laser source 100. The individual signals are amplified and the frequency spectra are analyzed by means of computing units 500 being connected with the photodiodes. An analyzer 600 compares the different results of the computing units 500. In the simplest case this can be done by a band-pass, only accepting the signal with the appropriate frequency. Knowing the sensor from which the signal is coming and therefore the angle of incidence it is possible to calculate back the real speed over ground as discussed above in connection with FIG. 3. This result is communicated via the interface 610 to the car management system or to a display, which informs the driver. Further a memory 620 may be used, which stores the velocities from a number of previous measurements. Knowing that the velocity only changes continuously and without larger jumps it is possible to extrapolate the previous measurements and to derive an "anticipated velocity". This can be used to select the most likely two sensors giving the good results and therefore further reduce the complexity of data processing.

In addition the anticipated velocity and therefore frequency may be used to electronically generate a frequency, which is mixed with the measured signal. By means of this method it may be possible to reduce the bandwidth of the signal, which has to be analyzed. Only the velocity differences are then measured. It should be noted that no accuracy is lost, because the difference between the anticipated velocity and the real velocity is measured, which gives a correct result. This method is still superior to any method trying to integrate over measured acceleration values. The method also offers some redundancy. If one of the sensors is not working (e.g. obstructed) the second best signal is still better than nothing.

This set-up adapts itself to large variations in speed. It is ensured that always a good signal is available. The multiplication of laser sources 100 and detectors 200 is in practice very simple and the measurement becomes very robust. The multiplication of laser sources 100 and detectors 200 is much more cost efficient than a very broadband amplification and signal analysis electronics. An array of VCSELs with an integrated micro-optics is also very small (about 1 mm), therefore yielding an extremely compact sensor module.

Figure 6:
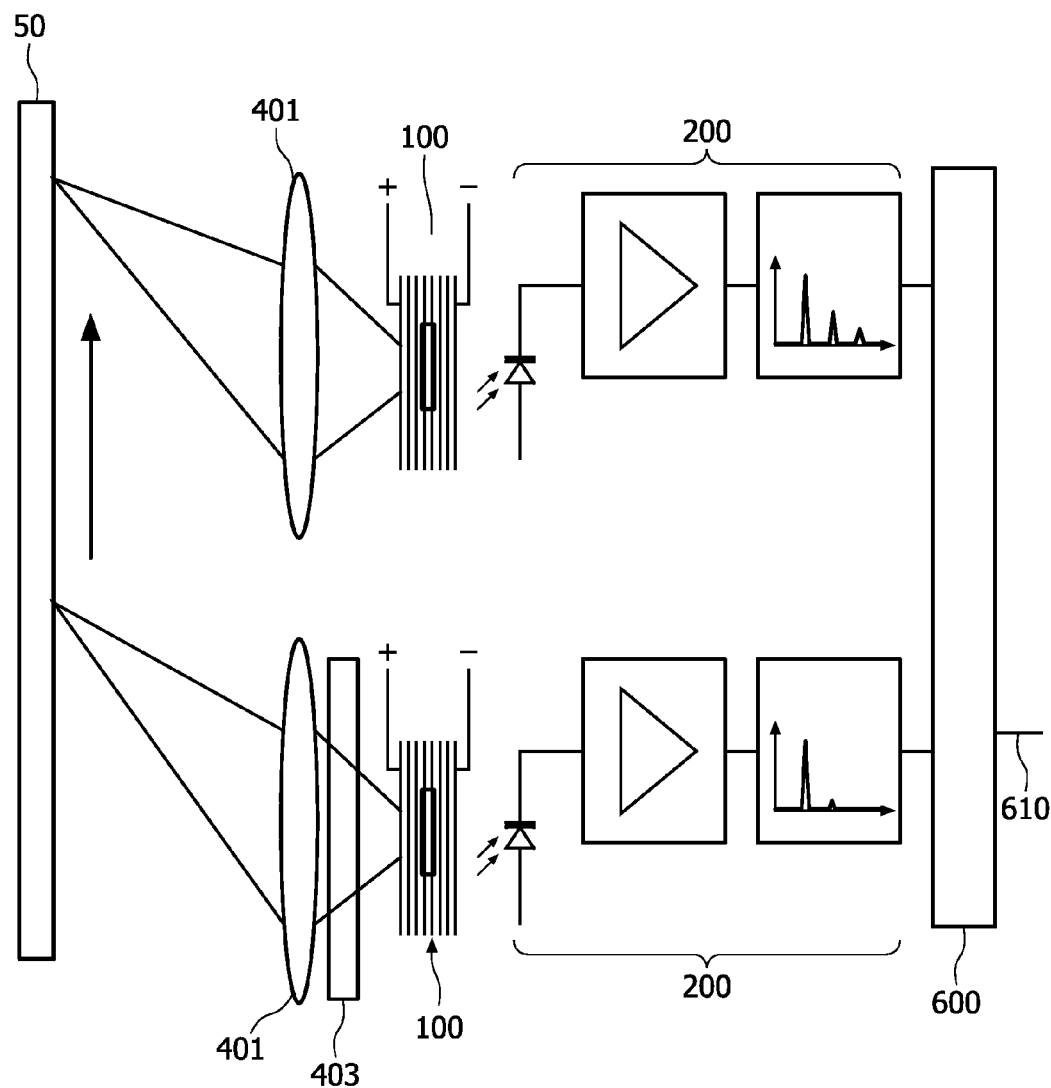
FIG. 6 shows a schematic view of a fifth embodiment according to the current invention with two laser sources and an optical attenuator used as control element.

FIG. 6 shows a schematic view of a fifth embodiment of a sensor module according to the current invention. In this embodiment two laser sources 100 (VCSELs) are combined. The control element 400 comprises lenses 401 and an optical attenuator 403. The VCSEL emits via the lenses focusing the laser light on the moving target 50 e.g. a road. The road scatters back an amount of laser light, which is focused by the lenses into the corresponding laser cavity. The amount of feedback determines the laser power, which is monitored on the backside of the VCSEL with the photodiodes being part of the detectors 200. The signal is amplified and the frequency spectrum is analysed by means of the detectors 200. The optical attenuator 403 attenuates the outgoing and incoming beam of one of the VCSEL, i.e. the effect is squared. In practice there will be more than just two channels. The ND filters may be set-up in a stage between individual sensors (e.g. 1:2:4:8). The laser light emitted by the single VCSELs can be focused on the road at consecutive positions along a line. In practice the distance between the VCSELs will be relatively small (<1 mm). If desired the lenses 401 can also be a microlens, just collimating the beam into a parallel one and an additional large lens for all laser elements together is used to focus them onto exactly the same position.

An analyzer 600 compares the different results of the detectors 200. The contribution of higher harmonics (the figure illustrates less higher harmonics in the attenuate case . . . ) as well as the height of the first peak over the noise level are analyzed and the best measurement is selected. This result is communicated via the interface 610 for example to a car management system or to a display, which informs the driver. The method also gives an indication about the feedback and the quality of the signal. This information can be used for a reliability indication or as an information about the road surface (an extreme example is the strongly changing feedback along a broken white line).

The method also offers some redundancy. If one of laser sources 100 or detectors 200 is not working (e.g. obstructed) the second best signal to noise may be used.

This set-up adapts itself to changing feedback conditions (like e.g. changing road surface). It is ensured that always a good signal is available. The multiplication of laser sources 100 and detectors 200 is in practice very simple and the measurement becomes very robust.

Figure 7:
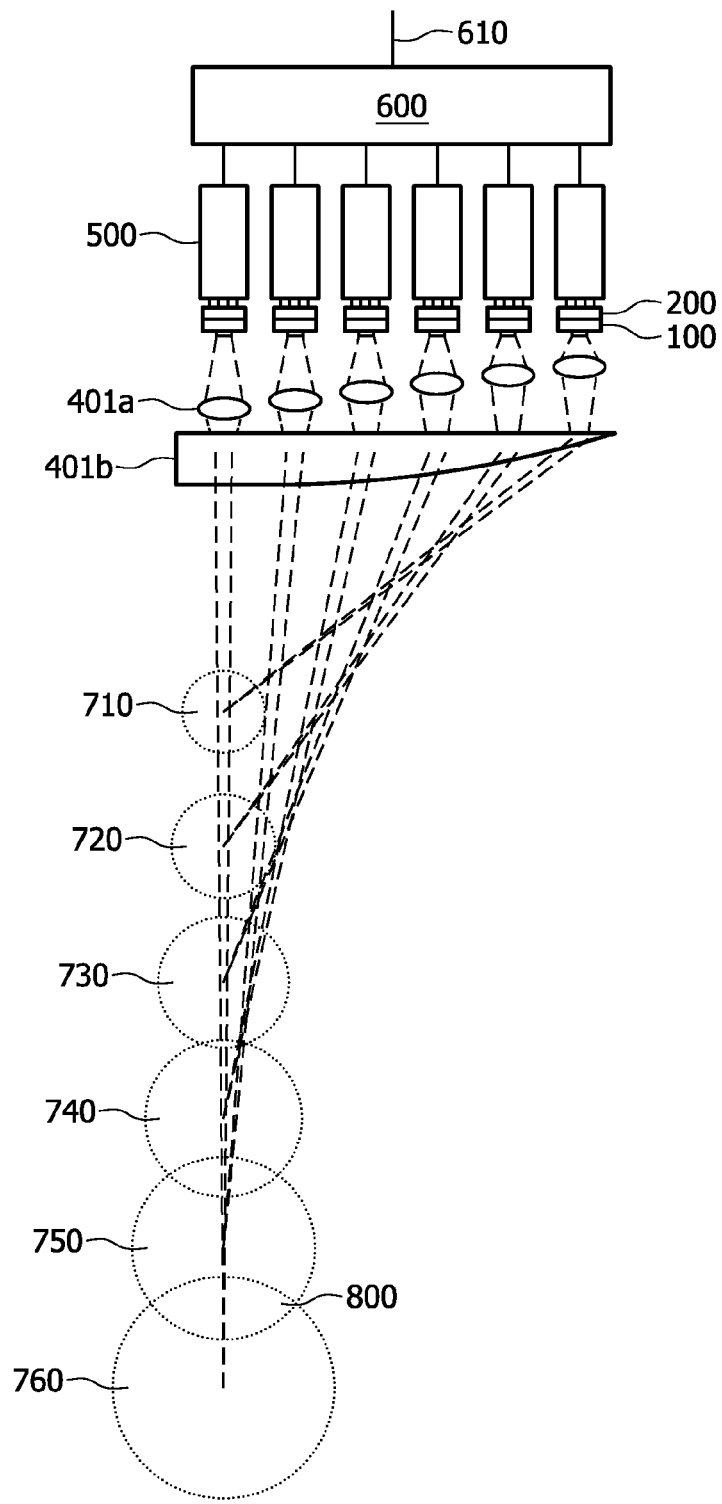
FIG. 7 shows a schematic view of a sixth embodiment according to the current invention with an array of laser sources and an arrangement of lenses used as control element.

FIG. 7 shows a schematic view of a sixth embodiment of a sensor module according to the current invention. In this embodiment an array of laser sources 100 (VCSELs) are combined. The control element 400 comprises passive optical elements as micro-lenses 401a and a common lens 401b. The laser light emitted by the VCSELs are collimated by the micro-lenses 401a and focused by the common lens 401b into different foci 710, 720, 730, 740, 750, 760. The different position of the micro-lenses 401a yield a different distance to the foci. A different focal length of the individual micro-lenses 401a would also do. A target (not shown) for example the surface of a road scatters back an amount of laser light, which is focused by the micro-lenses 401a and the common lens 401b into the laser cavities of the VCSELs. The amount of feedback determines the laser power, which is monitored on the backside of the VCSELs with photodiodes being used as detectors 200 being integrated with the laser in 100. The individual signals are amplified and the frequency spectra are analyzed by means of computing units 500 being connected with the photodiodes. Alternatively one computing unit 500 may be connected to all photodiodes being switched in parallel in order to reduce costs. An analyzer 600 compares the different results of the different computing units 500. The height of the beat frequency peaks over the noise levels and the peak widths are compared by means of the analyzer 600 and the best measurement is selected. This result is communicated via the interface 610 to a car management system or to a display if the sensor module is integrated in a car, which informs the driver. In an alternative approach the laser diodes and the photodiodes may be switched one after the other (sequentially), which may reduce the costs of the computing unit 500 and the analyzer 600 since the results can be derived by the computing unit one after the other. The switching of the laser diodes may be for example initiated by the computing unit 500 by following a fixed scheme. In an alternative embodiment the switching of the laser diodes and photodiodes may be triggered by means of the results of the computing unit 500 that means a subset of laser diodes and corresponding photodiodes is switched on, whereby this subset of laser diodes and corresponding photodiodes is selected with respect to the quality of the results of preceding measurements provided by the computing unit 500 (height of the beat frequency peaks over the noise level) in order to improve the time coverage of the measurement.

Disturbing objects in between the road and the sensor, which may move at different speed may be detected by means of the sensor module according to this embodiment as well. A practical example is water from rain or from the street. An unfocussed measurement set-up would yield several different velocities. An auto-focus system would most likely fail. The proposed invention would yield different velocities for laser sources 100 with integrated detectors 200 due to the different focus of the control element 400 with respect to the single laser source. This makes it simple for the analyzer 600 to decide, which velocity belongs to the road surface and not to the rain. There is also additional information about the speed and amount of disturbing objects available.

The embodiment according to the current invention may also be used to derive information about car load and driving conditions, as the distance to the road can be determined, too.

The method also offers some redundancy. If one of the sensors is not working (e.g. obstructed) the second best signal may be used. Alternatively an overlapping range of detection 800 may be used to control the measurement signals generated by different detectors 200.

This set-up adapts itself to changing distance to the object. It is ensured that always a good signal is available. The multiplication of laser sources 100 and detectors 200 is in practice very simple and the measurement becomes very robust.

The present invention will be described with respect to particular embodiments and with reference to certain drawings, but this is not to be construed in a limiting sense, as the invention is limited only by the appended claims. Any reference signs in the claims shall not be construed as limiting the scope thereof. The drawings described are only schematic and are non-limiting. In the drawings, the size of some of the elements may be exaggerated and not drawn to scale for illustrative purposes. Where the term "comprising" is used in the present description and claims, it does not exclude other elements or steps. Where an indefinite or definite article is used when referring to a singular noun, e.g. "a" or "an", "the", this includes a plural of that noun unless specifically stated otherwise.

Furthermore, the terms first, second, third and the like in the description and in the claims are used for distinguishing between similar elements and not necessarily for describing a sequential or chronological order. It is to be understood that the terms so used are interchangeable under appropriate circumstances, and that the embodiments of the invention described herein are capable of operation in other sequences than described or illustrated herein.

Moreover, the terms top, bottom, first, second and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Other variations of the disclosed embodiments can be understood and effected by those skilled in the art in practicing the claimed invention, from a study of the drawings, the disclosure, and the appended claims.

The invention claimed is:

1. A sensor module for measuring a distance to a target and/or a velocity of the target, the sensor module comprising:
   at least one laser source for emitting laser light,
   at least one detector being configured to detect modulated laser light and
   at least one control element the control element being configured to vary a focus point of the laser, such that the distance to the target and/or the velocity of the target is measurable at different focus points;
   wherein the sensor module further comprises at least two laser sources and at least two detectors and the laser sources are configured to emit laser light in essentially the same direction; and,
   wherein the control element is configured to vary the focus point of the laser light emitted by said at least two laser sources differently.

2. A sensor module according to claim 1, wherein the detector is configured to detect a modulation of resonating laser light in the laser source, the modulation of the laser light in the laser source being induced by reflected laser light reentering the laser source.

3. A sensor module according to claim 1, whereby the control element comprises an optical element and the optical element being placed between the target and the laser source.

4. A sensor module according to claim 1, wherein the sensor module comprises an array of laser sources and detectors and the control element for varying the focal point is a passive optical element.

5. A sensor module according to claim 4, wherein the passive optical element is a lens or a mirror or an optical attenuator.

6. A sensor module according to claim 1, wherein the range of detection of a first detector overlaps with the range of detection of at least one second detector.

7. A sensor module according to claim 6, the sensor module further comprising an analyzer, the analyzer being arranged to verify a first measurement signal resulting from the detection of modulated laser light detected by the first detector by comparing the first measurement signal with at least a second measurement signal resulting from the detection of modulated laser light detected by the second detector.

8. A sensor module according to claim 1, the sensor module further comprising a computing unit and an interface, the computing unit being arranged to determine a distance and/or a velocity data of the target based on measurement signals resulting from the detection of modulated laser light detected at least one detector and the interface being arranged to communicate the distance and/or velocity data of the target for further processing.

9. A sensor module according to claim 1, wherein the control element is further configured to vary the intensity of the laser light.

10. A sensor module according to claim 1, wherein the control element is further configured to vary the intensity of the laser light of the laser light emitted by at least two laser sources differently.

11. A method for measuring a distance to a target and/or a velocity of the target, the method comprising the steps of:
  emitting laser light by means of at least two laser sources;
  varying a focus point of the laser light and/or intensity of the laser light such that the distance to the target and/or the velocity of the target can be measured at different focus points; and,
  detecting modulated laser light by means of at least two detectors;
  wherein the laser light of said at least two laser sources is emitted essentially the same direction; and,
  wherein the focus point of the laser light emitted by said at least two laser sources is varied differently.

* * * * *